(12) United States Patent
Galliher, III et al.

(10) Patent No.: US 10,243,790 B2
(45) Date of Patent: *Mar. 26, 2019

(54) DYNAMIC NETWORK DEVICE CONFIGURATION

(71) Applicant: Amazon Technologies, Inc., Seattle, WA (US)

(72) Inventors: Richard H. Galliher, III, Seattle, WA (US); Justin O. Pietsch, Bothell, WA (US); Frederick David Sinn, Seattle, WA (US); Mark N. Kelly, Seattle, WA (US); Colin J. Whittaker, Dublin (IE); Rachit Chawla, Seattle, WA (US); Richendra Khanna, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 236 days.

This patent is subject to a terminal disclaimer.

(21) Appl. No.: 15/235,589

(22) Filed: Aug. 12, 2016

(65) Prior Publication Data

US 2016/0352569 A1 Dec. 1, 2016

Related U.S. Application Data

(63) Continuation of application No. 13/252,712, filed on Oct. 4, 2011, now Pat. No. 9,419,842.

(51) Int. Cl.
*G06F 15/177* (2006.01)
*H04L 12/24* (2006.01)
(Continued)

(52) U.S. Cl.
CPC .......... *H04L 41/0813* (2013.01); *H04L 29/06* (2013.01); *H04L 41/0806* (2013.01);
(Continued)

(58) Field of Classification Search
CPC . H04L 12/24; H04L 41/0813; H04L 41/0893; H04L 41/0886
(Continued)

(56) References Cited

U.S. PATENT DOCUMENTS 7,240,364 B1 7/2007 Branscomb et al.
7,567,822 B2 7/2009 Hart et al.
(Continued)

OTHER PUBLICATIONS

CISCO White Paper, Autoprovisioning Data Center Top-of-Rock Switches, dated Jun. 2010.

*Primary Examiner* — Frantz B Jean
(74) *Attorney, Agent, or Firm* — Knobbe Martens Olson & Bear LLP

(57) ABSTRACT

A dynamic configuration system can manage and configure switches or other network devices that come online in a network. When the dynamic configuration system determines that a network device has come online, the dynamic configuration system can identify the network device (e.g., based on its network location, neighbors, fingerprint, identifier, address or the like), select the appropriate configuration data for the network based on the desired network topology, and transmit the configuration data to the network device. The network device can then load the configuration data and function as a component of the desired network topology.

20 Claims, 5 Drawing Sheets

(51) Int. Cl.
  *H04L 29/06* (2006.01)
  *H04L 29/08* (2006.01)
  *H04L 12/933* (2013.01)

(52) U.S. Cl.
  CPC ...... *H04L 41/0886* (2013.01); *H04L 41/0893* (2013.01); *H04L 41/12* (2013.01); *H04L 49/1515* (2013.01); *H04L 67/34* (2013.01); *H04L 29/08072* (2013.01)

(58) Field of Classification Search
  USPC .......................................................... 709/220
  See application file for complete search history.

(56) References Cited

U.S. PATENT DOCUMENTS

| | | |
|---|---|---|
| 7,606,175 B1 | 10/2009 | Maufer |
| 7,941,512 B2 | 5/2011 | Droms et al. |
| 8,918,631 B1 | 12/2014 | Kumar |
| 2002/0116485 A1 | 8/2002 | Black et al. |
| 2002/0165961 A1 | 11/2002 | Everdell |
| 2003/0112764 A1 | 6/2003 | Gaspard et al. |
| 2004/0031030 A1 | 2/2004 | Kidder |
| 2004/0083306 A1 | 4/2004 | Gloe |
| 2004/0209634 A1 | 10/2004 | Hrastar |
| 2004/0240654 A1 | 12/2004 | Ozaki |
| 2005/0018665 A1* | 1/2005 | Jordan .................. H04L 45/06 370/388 |
| 2006/0251067 A1 | 11/2006 | DeSanti et al. |
| 2007/0082677 A1* | 4/2007 | Donald Hart ......... H04W 16/18 455/456.1 |
| 2008/0247355 A1 | 10/2008 | Ahn |
| 2009/0262662 A1 | 10/2009 | Ramachandran et al. |
| 2009/0303880 A1 | 12/2009 | Maltz |
| 2009/0307334 A1 | 12/2009 | Maltz |
| 2010/0172645 A1 | 7/2010 | Liu |
| 2011/0123014 A1 | 5/2011 | Smith |
| 2011/0130144 A1 | 6/2011 | Schein |
| 2011/0149964 A1 | 6/2011 | Judge et al. |
| 2011/0299413 A1 | 12/2011 | Chatwani |

* cited by examiner

DYNAMIC NETWORK DEVICE CONFIGURATION

CROSS-REFERENCE TO RELATED APPLICATIONS

This application is a continuation of U.S. patent application Ser. No. 13/252,712, entitled "DYNAMIC NETWORK DEVICE CONFIGURATION," filed Oct. 4, 2011, and soon to issue as U.S. Pat. No. 9,419,842, the entirety of which is hereby incorporated herein by reference.

BACKGROUND

Generally described, computing devices utilize a communication network, or a series of communication networks, to exchange data. In a common embodiment, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

In practice, in a packet-switched communication network, packets are transmitted between multiple physical networks, or sub-networks. Generally, the physical networks include a number of hardware devices that receive packets from a source network component and forward the packet to a recipient network component. The packet routing hardware devices are typically referred to as routers. Generally described, routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

To execute the control plane functionality, routers can maintain a forwarding information base ("FIB") that identifies, among other packet attribute information, destination information for at least a subset of possible network addresses, such as Internet Protocol ("IP") addresses. In a typical embodiment, the FIB corresponds to a table of values specifying network forwarding information for the router.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the inventions disclosed herein.

DETAILED DESCRIPTION

Figure 1A:
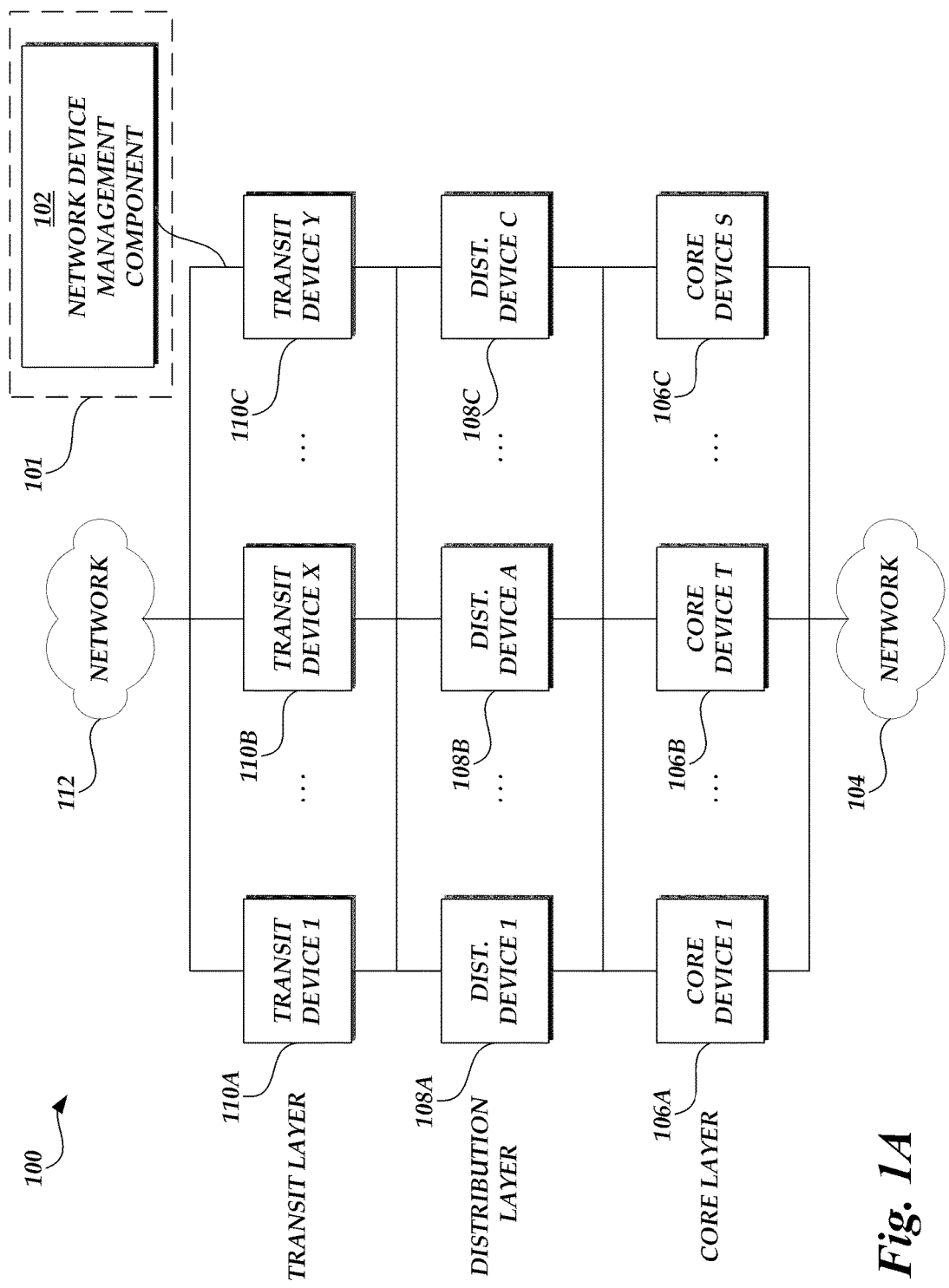
FIG. 1A is a block diagram illustrative of one embodiment of a distributed routing environment including a network device management component.

By way of overview, this disclosure describes, among other things, a distributed switching or routing architecture, which may include a dynamically configured switching layer. Such a switching layer can be used in a hierarchical distributed routing architecture including multiple logical levels, or layers, for receiving, processing and forwarding data packets between network components. In one embodiment, the routing architecture includes three logical levels that correspond to a core level, a distribution level and a transit level. The switching layer can provide packet transport within and/or between each layer.

In one embodiment, the switching layer includes fixed configuration network components/hardware, such as fixed configuration switches or routers. Typically, lower cost fixed configuration network devices have fewer ports than higher cost products, requiring more lower cost products to provide the same number of ports as higher cost products. While the functionality of a high cost switch could be replicated using an array of interconnected low cost switches, this increases the number of devices that have to be managed in the network. For example, if the functionality of the high cost switch can be replicated with eight low cost switches, then instances of the high cost switch could be replaced with low cost hardware but with an eight-fold increase in the number of switching devices. Thus, a system that allows dynamic configuration of those low cost switches would be beneficial.

Embodiments of a dynamic configuration system ("DCS") are described below. In one embodiment, the dynamic configuration system manages and configures switches or other network devices that come online in a network. When the dynamic configuration system 101 determines that a network device has come online, the dynamic configuration system 101 can identify the network device (e.g., based on its network location, neighbors, fingerprint, identifier, address, combinations of the same, or the like), select the appropriate configuration data for the network based on the desired network topology, and transmit the configuration data to the network device. The network device can load the configuration data and function as a component of the desired network topology.

In one embodiment, the network devices are high functionality routing hardware components that can include customized chipsets, memory components and software that allows a single router to support millions of entries in the FIB. However, such high functionality routing hardware components are typically very expensive and often require extensive customization. In one embodiment, the network devices are low cost, fixed configuration routing hardware components that are made of more generic components and can be less expensive than high cost, high functionality routing hardware components by a significant order of magnitude. However, such fixed configuration routing hardware components typically only support FIBs on the order of thousands of entries. Thus, arrays of such fixed configuration routing hardware components can be used to provide greater capabilities.

Various implementations, combination and applications for dynamically configuring network devices will be described in accordance with the distributed routing and/or switching environment. However, these embodiments and examples are illustrative in nature and should not be construed as limiting.

Turning now to FIG. 1A, an example distributed routing environment 100 for implementing a hierarchical distributed routing architecture will be described. A dynamic configuration system 101 operating on the distributed routing environment 100 can include a network device management component 102, data storage, and other components of the distributed routing environment. The distributed routing environment 100 includes a network device management component 102 for controlling the dynamic network device configuration in the distributed routing environment 100. Specifically, the network device management component 102 can manage and configure switches or other network devices that request configuration data (e.g., during startup or a reconfiguration process) on the distributed routing environment 100.

In one embodiment, the network device management component 102 can correspond to a computing device in communication with one or more components of the distributed routing environment 100. Illustrative computing devices can include server computing devices, personal computing devices or other computing devices that include a processor, memory and other components for executing instructions associated with the function of the network device management component 102. In another embodiment, the network device management component 102 may be implemented as a software component that is executed on one or more of the router components described below. Illustratively, the network device management component 102 can maintain, store and/or update network topology data associated with the distributed routing environment 100. For example, the network device management component 102 can receive a desired network topology configuration created by a network design system. The network device management component 102 can then dynamically configure network devices in the distributed routing environment 100 based at least partly on the desired network topology. Examples of such network topologies can include Clos networks, regular mesh, hypercube, ring, 3D cube, 2D or 3D torus, as well other topologies.

With continued reference to FIG. 1A, the distributed routing environment 100 includes a first communication network 104 that transmits data packets to the distributed routing environment 100. The first communication network 104 may encompass any suitable combination of networking hardware and protocols necessary to establish packet-based communications to the distributed routing environment 100. For example, the communication network 104 may include private networks such as local area networks (LANs) or wide area networks (WANs) as well as public or private wireless networks. In such an embodiment, the communication network 104 may include hardware (e.g., modems, routers, switches, load balancers, proxy servers, etc.) and software (e.g., protocol stacks, accounting software, firewall/security software, etc.) that establishes a networking link with the distributed routing environment 100. Additionally, the communication network 104 may implement one of various communication protocols for transmitting data between computing devices. The communication protocols can include protocols that define packet flow information, such as network address information corresponding to the Internet Protocol version 4 (IPv4) or the Internet Protocol version 6 (IPv6) Internet Layer communication network protocols. The distributed routing environment 100 may be applicable with additional or alternative protocols and that the illustrated examples should not be construed as limiting.

In communication with the first communication network 104 is a first level of the distributed routing environment 100, generally referred to herein as the core layer or core level. In one embodiment, the core level corresponds to one or more network device components (e.g., switches or routers), generally referred to as core level network devices 106A, 106B and 106C. As previously described, within the distributed routing environment 100, the core level network devices 106A, 106B, 106C can receive an incoming packet from a component of the network 104 and process the destination address by identifying a distribution level network device component based on a subset of the destination address associated with the received packet. Illustratively, the subset of the destination address can correspond to less than the entire destination IP address, such as the highest most values of the IP address.

The distributed routing environment 100 can further include a second level of logical network device components, generally referred to as the distribution layer or distribution level. In one embodiment, the distribution level corresponds to one or more network device components, generally referred to as distribution level network devices 108A, 108B and 108C. As previously described, within the distributed routing environment 100, the distribution level network devices 108A, 108B and 108C can receive an incoming packet from a core routing component 102 and process the destination address by identifying a transit level network device component based on at least a subset of the destination address associated with the received packet. Illustratively, the subset of the destination address can correspond to a larger subset of the destination IP address used by the core level network devices 106A, 106B, 106C. In this embodiment, the routing preformed by the distribution level can correspond to a more refined routing of the received packet relative to the core level routing.

In communication with the distribution layer router components is a third level of network device components, generally referred to as the transit layer or transit level. In one embodiment, the transit level corresponds to one or more network device components, generally referred to as transit level network devices 110A, 110B, and 110C. As previously described, the transit level network devices 110A, 110B, 110C receive the forwarded packet from a distribution level network device component 108A, 108B, 108C and forward the packet "upstream" to another communication network 112 node. Illustratively, each transit level network device 110A, 110B, 110C can be configured to communicate with one or more upstream peers such that some or all packets destined for an associated peer network component will be transmitted through the assigned transit level network device 110A, 110B, 110C (or a redundant network device).

Similar to communication network 102, communication network 112 may encompass any suitable combination of networking hardware and protocols useful for establishing packet-based communications to the distributed routing environment 100. For example, the communication network 112 may include private networks such as local area networks (LANs) or wide area networks (WANs) as well as public or private wireless networks. In such an embodiment, the communication network 112 may include hardware (e.g., modems, routers, switches, load balancers, proxy servers, etc.) and software (e.g., protocol stacks, accounting software, firewall/security software, etc.) for establishing a networking link with the distributed routing environment 100. As described above with regard to the communication network 104, the communication network 112 may implement one of various communication protocols for transmitting data between computing devices. The communications networks described herein may be applicable with additional or alternative protocols, and the illustrated examples should not be construed as limiting.

In an illustrative embodiment, the network device components (106, 108, 110) in FIG. 1A may correspond to a computing device having processing resources, memory resources, networking interfaces, and other hardware/software for carrying, processing, and/or forwarding packets on the distributed routing environment.

Figure 1B:
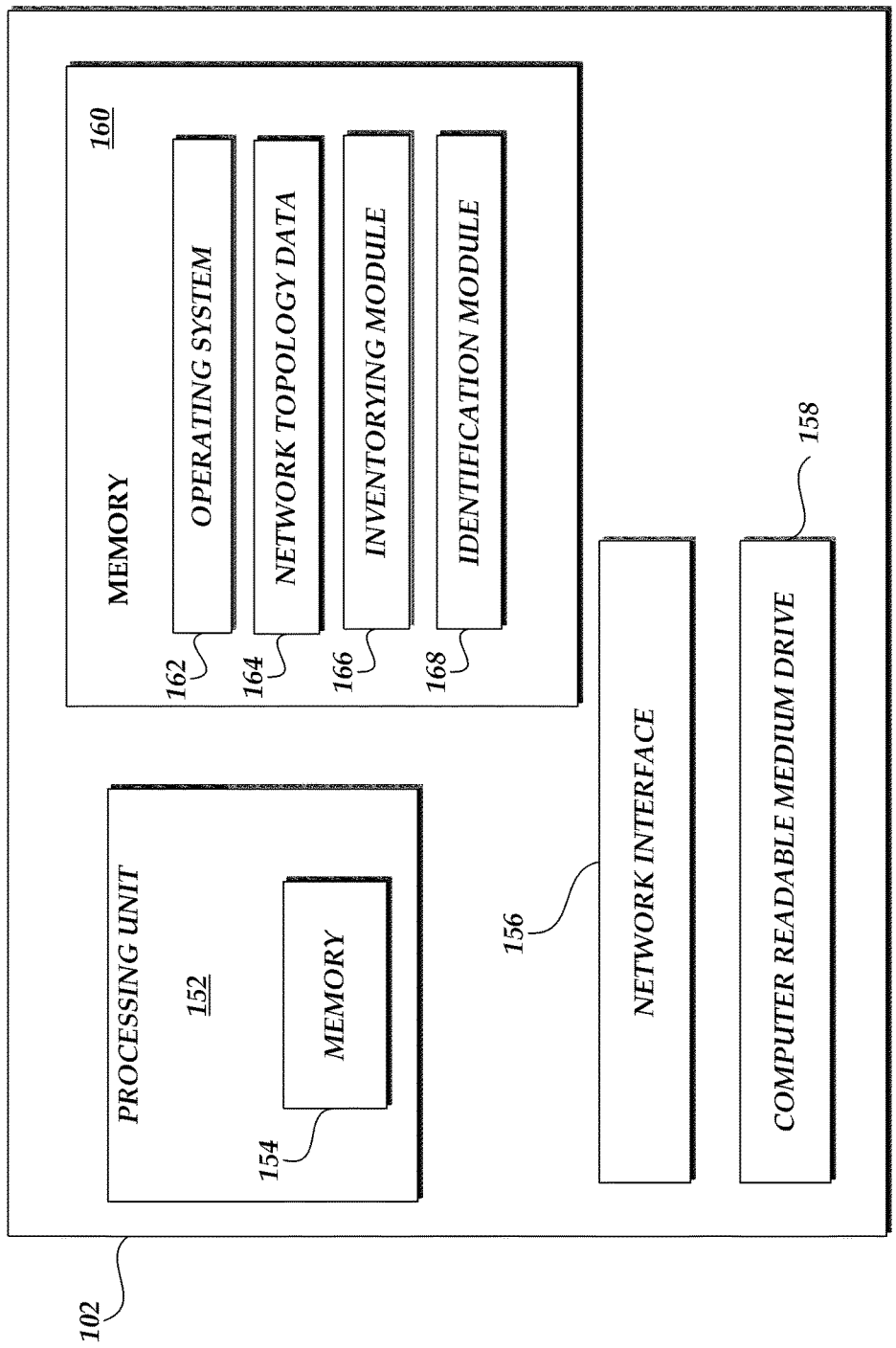
FIG. 1B is a block diagram illustrative of example components of a network device management component utilized in accordance with the distributed routing environment of FIG. 1A.

With reference now to FIG. 1B, a block diagram illustrative of components of a network device management component 102 utilized in accordance with the distributed routing environment 100 of FIG. 1A will be described. The network device management component 102 may include many more (or fewer) components than those shown in FIG. 1B.

As illustrated in FIG. 1B, the network device management component 102 can include a processing unit 152, at least one network interface 156, and at least one computer readable medium drive 158, some or all of which may communicate with one another by way of a communication bus. The processing unit 152 may thus receive information and instructions from other computing systems or services via a network. The processing unit 152 may also be associated with a first memory component 154 for recalling information utilized in the processing of destination address information, such as at least a portion of a FIB associated with the distributed routing environment 100. The memory 154 generally includes RAM, ROM and/or other persistent memory. The processing unit 152 may also communicate to and from memory 160. The network interface 156 may provide connectivity to one or more networks or computing systems. The at least one computer readable medium drive 158 can also correspond to RAM, ROM, optical memory, and/or other persistent memory that may persist at least a portion of the FIB or other routing table data associated with the distributed routing environment 100. In an illustrative embodiment, the access time associated with the memory component 154 may be faster than the access time associated with the computer readable medium driver 158. Still further, the computer readable medium drive 158 may be implemented in a networked environment in which multiple network devices share access to the information persisted on the computer readable medium drive 158.

The memory 160 can contain computer program instructions that the processing unit 152 executes in order to provide dynamic configuration of the network devices on the network. The memory 160 generally includes RAM, ROM and/or other persistent memory. The memory 160 may store an operating system 162 that provides computer program instructions for use by the processing unit 152 in the general administration and operation of the network device management component 102. In one embodiment, the memory 160 includes network topology data 164. The network topology data 164 can include an expected topology or topologies of one or more networks or portions of networks (e.g., sub networks), including how network devices of a particular network or portion of a network are expected to be interconnected with each other. For example, the network topology data 164 can include data on how the network devices on a network are expected to be laid out and/or identifying information about expected network devices in the network.

In one embodiment, the memory 160 includes an inventorying module 166. The inventorying module 160 can collect network information (e.g., identification data) about network devices on the network. The network information can be compared with the network topology data in order to identify the network devices.

In one embodiment, the memory 160 includes an identification module 168 that determines the identities of unidentified network devices on the network. The identification module 168 can use the network topology data 164 to identify a network device, for example, by comparing identification data for one or more neighboring network devices of the network device with the network topology data and finding a network device identity in the network topology data having the same identified neighboring network devices. Other identification methods can also be used. In one implementation, the network topology surrounding a particular network device is matched with stored network topology data to identify the particular network device based on the expected network layout identified by the stored network topology data.

Figure 2:
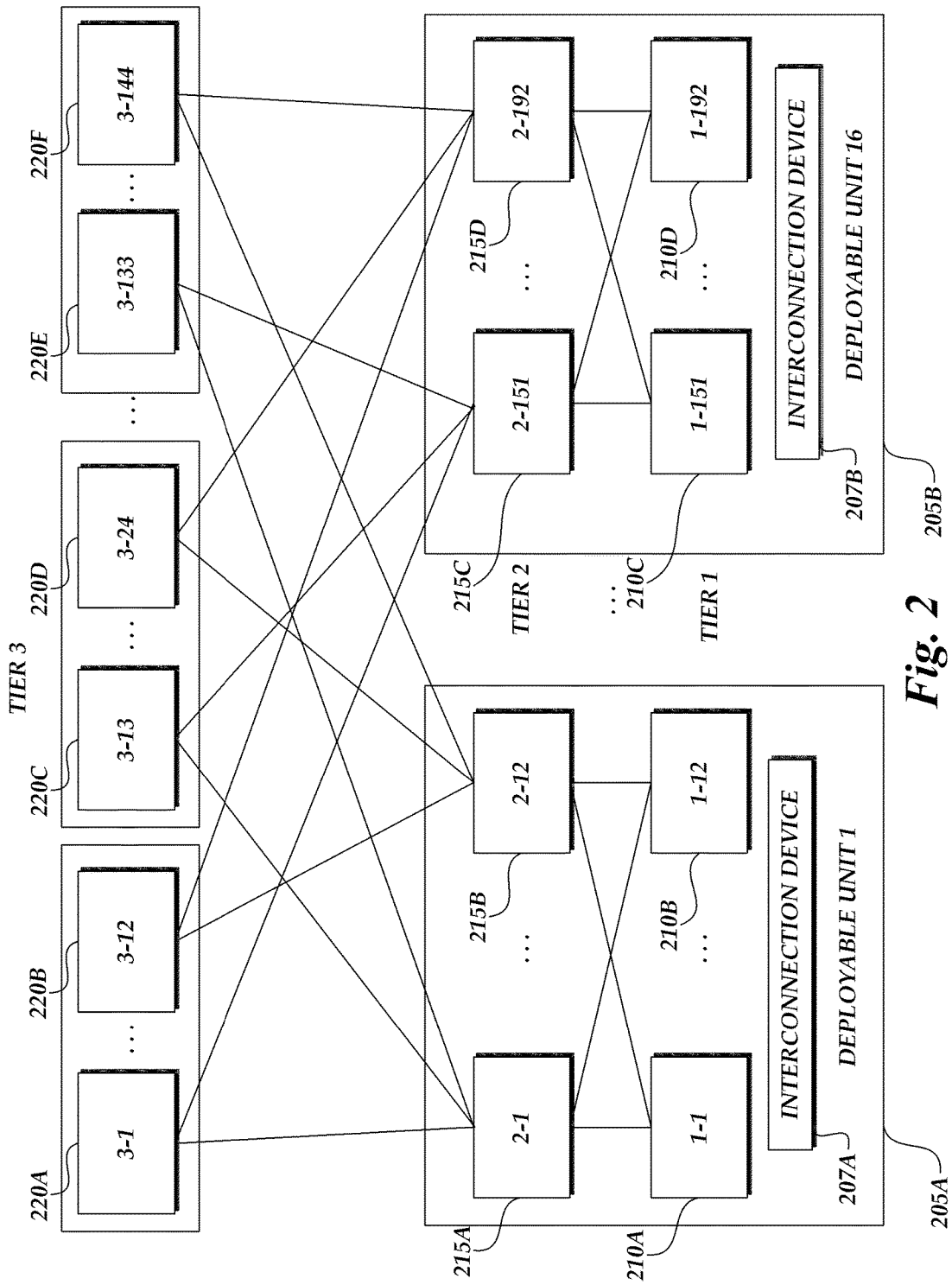
FIG. 2 is a network diagram schematically illustrating an example of a three-tier Clos topology having switching arrays or deployable units.

Continuing to the next figure, FIG. 2 is a network diagram schematically illustrating an example of a three-tier Clos topology having switching arrays or "deployable units" 205A, 205B that can be assembled from fixed configuration hardware (or optionally, non-fixed configuration hardware). In one embodiment, the network devices of FIG. 2 correspond with the network devices of FIG. 1 (106, 108, 110), wherein the network devices are arranged into a Clos topology. In one embodiment, the network devices of FIG. 2 are dynamically configured by the dynamic configuration system 101.

In one embodiment, each deployable unit 205A, 205B includes multiple switches or other network devices forming a two-tier Clos network. A Clos network is a kind of multistage circuit switching where, advantageously, the number of crosspoints required can be much fewer than if the entire switching systems were implemented with one large crossbar switch.

The following are some general characteristics of Clos networks. Not all the characteristics need to be present in implementations of the dynamic configuration system 101 utilizing Clos networks. Further, as will be apparent, embodiments of the dynamic configuration system 101 can be utilized in networks using other network topologies.

1. if n is the number of ports per switch and T is the number of tiers in a given Clos network,
2. then number of host ports, $N=2(n/2)^T$,
3. number of switches in the network, $S=(2T-1)(n/2)^{(T-1)}$,
4. number of links in the network (including those to hosts), $C=2T(n/2)^T$ [i.e. *$C=T \cdot N$*],
5. number of switch-to-switch links, $C-N$
6. number of SPF paths, R, in a Two-Tier (Three-Stage) network is $n^2$ and in a Three-Tier (Five-Stage network) is $(n^4/4)$.
7. OSPF LSA Flooding Load per device in a Two-Tier network is 2 nL, where L is the number of link state changes. In a Three-Tier network the LSA Flooding Load is 4 nL.
8. number of next-hops per prefix (subnet), H, at the edges of a Clos network is $n/(2O)$ where O is the level of over-subscription.

9. number of host prefixes (subnets), P, in a Two-Tier network is the same as the number of leaf-switches, which is n. In a Three-Tier network P equals $n^2/2$.
10. the size of the FIB table, F (H*P), for a Two-Tier network is $(n^2/2)$ and that for a Three-Tier network is $n^3/4$.
11. the amount of SPF calculation load or complexity, O for a Two-Tier network is $(n^2)$ and that for a Three-Tier network is $n^4/4$. For example, for a given value of n as you go from a Two-Tier to a Three-Tier network, the computational complexity goes up by a factor of $n^2$. Similarly, when you double the port count on a switch (i.e. double n), the computational complexity goes up by a factor of 4 for a Two-Tier network and a factor of 16 for a Three-Tier network.
12. for a two-tiered network (T=2) 33% of switch-ports face the hosts
13. for a three-tiered network (T=3)
    20% of switch-ports face the hosts
    the number of host ports is $P_n$ is $n^2/4$
    the number of Pods P is n
    the number of switches in a Pod $P_s$ is n.
    the number of switches in the third tier $S_{T3}$ is $n^2/4$.
    total number of cables in a 'normal' Clos Network, $C=2T(n/2)^T$, where n is the number of ports/switch and T is the number of Tiers.
    number of cables between Tier-1 and Tier-2, $C_{T1-T2}=(n^T)/2$.
    number of cables between Tier-2 and Tier-3, $C_{T2-T3}=(n^T)/(4)$.

In FIG. 2, Deployable Unit 1 (205A) includes 12 switches, 1-1 (210A) to 1-12 (210B), in Tier 1 and 12 switches, 2-1 (215A) to 2-12 (215B), in Tier 2. The Tier 1 switches are connected to the Tier 2 switches in a Clos topology. The network devices of the deployable unit can be interconnected by an interconnection device 207A, 207B (e.g., a rack switch). Each deployable unit can form a deployable unit in a network data center. In one embodiment, each deployable unit can be built using a single server rack, with switches installed on the rack. In another embodiment, the deployable unit can be spread over more than one server rack. In FIG. 2, each deployable unit 205A, 205B can be formed by 24 switches in a server rack. The number of switches shown in each deployable unit 205A, 205B is merely illustrative, and other numbers of switches may be chosen in other embodiments.

In FIG. 2, sixteen deployable units are interconnected with 144 switches (220A-F) in Tier 3 in a three-tier Clos topology. The illustrated topology includes a total of 528 switches. Assuming each switch in the three tiers has 24 ports, then a total of 2304 host ports are available for network devices to connect to. Different sized switches can also be used to provide greater or lesser number of ports with the same number of deployable units. For example, 24 port or 48 port switches could be used. In one embodiment, the network can include switches of different sizes.

Once larger switch sizes are available or are desired, the components in the Clos topology can be upgraded to increase the number of host ports. In one example scenario, an existing data center having a network as configured in FIG. 2 could be upgraded by replacing the Tier 3 switches with 48 port switches. This allows the number of ports to be increased without changing the deployable units comprising the Tier 1 and Tier 2 layers. In one scenario, deployable units using 48 port (or 64 port, 128 port, etc.) switches could then be used when additional deployment units are desired. Deployable units using switches with more ports can interconnect more Tier 3 switches, thereby making available more host ports than deployable units using smaller switches. Further, in other embodiments, more (or fewer) tiers than three tiers can be implemented using deployable units and/or other network components.

In one embodiment, the switches in a brick are connected to other switches via cables. Such cables can be copper, fiber optic or other cable material. In one embodiment, each switch runs the Open Shortest Path First (OSPF) routing protocol (or another routing protocol) with its neighbors. In one embodiment, switches in the brick are connected to at least one other switch. In other embodiments, each switch may be connected to two or more switches, for example, to build redundancy. Each deployable unit can be an OSPF area or logical collection of links with the same area identification. In one embodiment, a switch (or other network device) within an area maintains a topological database only or mainly for the area to which it belongs. The switch does not have to maintain detailed information about network topology outside of its area, thereby reducing the size of its database.

When switches (or other network devices) in a deployable unit are brought online for the first time (or if restarted or otherwise reconfigured), the switches can communicate with the dynamic configuration system 101 (see FIG. 1A) in order to obtain configuration data. In one embodiment, the switches download a configuration file from the dynamic configuration system 101 and use the configuration data from the file to set their network configurations. Such configuration data can include the IP addresses, hostname, credentials, login data, designated management devices (e.g., FIB manager or other device providing network services), OSPF configuration or other protocol configuration data, routing table data, combinations of the same, or the like.

By dynamically obtaining configuration data, setup of the deployable unit can be simplified since the switches do not need to be pre-configured or may only need minimal pre-configuration. For example, in one embodiment, the switches can be configured with the network address of the dynamic configuration system 101 from which it then requests configuration data. In certain embodiments, this dynamic configuration allows deployable units to be set up identically and only configured differently when brought online, simplifying setup and configuration. For example, a data center operator can set up two identically configured deployable units but plug them into two networks configured with different network topologies. When the devices in the deployable unit boot up, the devices can obtain configuration data from the dynamic configuration system 101 and can then be automatically configured with the right configuration data for their respective network topologies.

By utilizing dynamic configuration, the deployable units can act as modular pieces of the network. Networks can be upgraded or extended by plugging in a new deployable unit, and the network devices of the deployable unit can automatically configure themselves according to where the deployable unit is placed on the network and/or where the network devices are located in the deployable unit. In one advantageous scenario, an existing network topology can be updated by swapping out existing deployable units with more capable deployable units (e.g., faster or having more ports). When the devices in the deployable unit start up, they can configure themselves with identical or similar information (some information such as IP addresses for interfaces may change) and automatically replicate the functionality of the replaced deployable unit. In another scenario, a deployed deployable unit having problems could be replaced with a replacement deployable unit, allowing the previously deployed deployable unit to be diagnosed while off-line. This can limit the down-time of the network. In another scenario, a new network topology can be implemented by replacing the topology information in the dynamic configuration system 101, redeploying and restarting the deployable units, and allowing the deployable units to obtain configuration data for the new network topology from the dynamic configuration system 101. There are many potential advantages provided by utilizing the dynamic configuration system 101, for many different types of networks. For example, while the above disclosure refers to a distributed routing environment 100 in FIG. 1 and a Clos network topology in FIG. 2, the dynamic configuration system 101 can be used with other types of networks (e.g., centralized, virtual networks, etc.) and other topologies (e.g., regular mesh, hypercube, ring, 3D cube, 2D or 3D torus, etc., or combinations thereof) to provide similar functionality.

Figure 3:
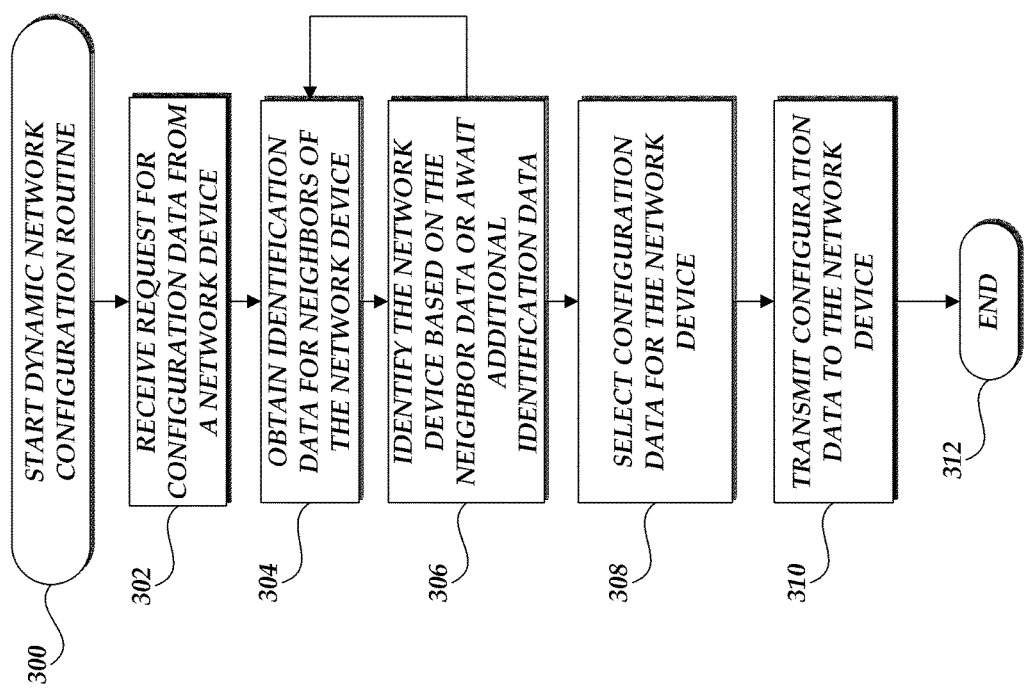
FIG. 3 is a flow diagram illustrative of an embodiment of a dynamic configuration routine.

FIG. 3 schematically illustrates a logical flow diagram for an embodiment of a dynamic configuration routine 300. In some implementations, the routine 300 is utilized by embodiments of the dynamic configuration system 101 described with reference to FIG. 1 or by one of its components, such as the network device management component 102. For ease of explanation, the following describes the services as performed by the dynamic configuration system 101. Further, the following describes the routine with respect to a single network device. However, the routine can be performed with multiple network devices and can be performed in parallel. For example, the routine can be performed for a set of the network devices in a deployable unit (e.g., some or all of the network devices) when the deployable unit is brought online or otherwise reconfigured. The example scenario is intended to illustrate, but not to limit, various aspects of the dynamic configuration system 101.

Beginning at block 302, the dynamic configuration system 101 receives a startup announcement or request for configuration data from a network device, such as one or more switches in a deployable unit 205A, where the network device may be missing at least some configuration data. The dynamic configuration system 101 can monitor the network on which it is operating in order to identify such starting network devices. For example, the dynamic configuration system 101 can monitor a broadcast address of the network and respond to requests for configuration data received on the broadcast network. In one embodiment, network devices may be preconfigured with a network address of the dynamic configuration system 101 and the dynamic configuration system 101 receives requests on that address. In one embodiment, the network devices obtain the dynamic configuration system's 101 network address during a configuration process, such during a Dynamic Host Configuration Protocol (DHCP) process.

At block 304, the dynamic configuration system 101 obtains identification data for neighbors of the network device. Such neighbor identification data can be used to identify the physical network location of the device and can include network addresses (e.g., MAC or IP), routing data, network topology information, device name, port name or other network data. In one example scenario, the dynamic configuration system 101 can use the Simple Network Management Protocol (SNMP) or the like to communicate with the network device and obtain neighbor data and/or device data. The dynamic configuration system 101 can also instruct the network device to obtain the neighbor data, if the network device doesn't already have it. For example, the network device can use the Link Layer Discovery Protocol (LLDP) or another discovery protocol to obtain the neighbor data. Once the data is obtained, the network device can send the data to the dynamic configuration system 101.

At block 306, the dynamic configuration system 101 identifies the network device based at least partly on the neighbor data, including the identification data for the neighboring network devices. The dynamic configuration system 101 can attempt to identify a network device based at least partly on its surrounding neighbors, for example, by determining the topology of the location in the network in which the network device is located and matching that topology with an expected network topology for the network. The dynamic configuration system 101 can also use other data, such as device data, to identify the network device. In one embodiment, the dynamic configuration system 101 can generate fingerprints for the network devices it is seeking to identify and compare those fingerprints with expected fingerprints associated with the network topology data stored by dynamic configuration system 101.

In one embodiment, the network device operates a specifically chosen version or release of the appropriate Operating System (OS) for the hardware. The network device can include a bootstrap configuration mode or can be provided with a bootstrap configuration file. In one embodiment, the bootstrap configuration is configured to do one or more of the following:

a) Give some or all Ethernet interface its own bridge to prevent flooding and spanning-tree decisions;

b) Enable Link Layer Discovery Protocol (LLDP), Cisco Discovery Protocol (CDP), Industry Standard Discovery Protocol (ISDP) or other link-layer neighbor discovery protocols; and/or c) Enable SNMP or command-line interface (CLI) access in order to data-mine the information held within the discovery protocol tables or data structures.

In one embodiment, the dynamic configuration system 101 generates a model of the relationships found in the end-result network. In one embodiment, data is stored from some or all of the devices in the network. The stored data can include local IP address (e.g., expressed in Classless Inter-Domain Routing (CIDR) notation), local interface or local port name, local device or hostname, remote IP address (e.g., in CIDR notation), remote interface or the name of the remote port. The values may be strings and/or numbers. The data may be obtained by an inventory routine that collects and stores the data using SNMP, CLI, interrupts, SNMP traps, Syslog or other methods. The inventory routine can gather the attributes of an unidentified device and determine its relationship with other devices (e.g., identified or awaiting identification). The data from the identified device can be combined with the other devices and used to determine the identification of the unidentified device as well as other devices awaiting identification.

In one embodiment, the dynamic configuration system 101 maintains expected network topology information and matches the neighbor data with the expected network topology information to identify the network location of the network device. For example, referring to FIG. 2, if a new switch comes up and identifies itself as having the 2-1 (215A) and 2-12 (215B) switches as neighbors, the dynamic configuration system 101, referring to its stored network topology information (e.g., a network topology map similar to FIG. 2, a table of interconnections, or other representation of a network topology), can identify that the new switch is switch 1-1 (210A) based on its neighbors.

In some cases, identity data of the actual neighboring network devices may not match the expected neighboring data based on the network topology information. For example, there may be cabling errors in how network devices of a deployable unit are connected together. Since each deployable unit can have hundreds of ports, the cabling process can be complex and mistakes in cabling can occur. For example, referring to the previous example, if new switch 1-1 (210A) is connected to network device 2-1 (215A) but was incorrectly cabled to network device 2-11 instead of network device 2-12 (215B), then the identification data from its neighbors would not match the expected neighbor identities from the stored network topology data. Thus, in one embodiment, the dynamic configuration system 101 may generate a confidence score for how certain it is that the network device matches an identity in the network topology. Such a confidence score could be based at least partly on how many neighbors of the network device match the expected neighbors and/or other identification data. In one embodiment, the dynamic configuration system 101 associates the network device with a particular identity if the confidence score exceeds a certain threshold (e.g., 50%, 70%, 80%, 90%, etc.).

After identifying the network device, the dynamic configuration system 101 can proceed to block 306. If additional identification data is desired or needed, the dynamic configuration system can wait for more identification to be obtained. Once new identification data is received (e.g., when a new device boots up), the routine 300 can then proceed to block 304 to process the new identification data.

At block 308, the dynamic configuration system 101 selects configuration data for the network device based at least partly on its identified network location. In one embodiment, the network topology data includes associations of configuration data with network device identities, which the dynamic configuration system 101 can refer to in order to determine what configuration data is associated with a particular network device identity.

As described above, configuration data can include various network configuration data for setting up the network device. For example, the dynamic configuration system 101 can provide routing table data (e.g., FIB) to the network device to configure its routing paths. In one embodiment, the routing tables can be used to implement logical network topologies over the physical network topology of the network devices (e.g., a Clos topology).

In one embodiment, different device identities are designated to receive different configuration data. For example, one identity can be designated to receive a first combination of configuration data (e.g., IP addresses, hostname, etc.) while a second identity can be designated to receive a second combination of configuration data. In one embodiment, one or more of the network devices may be designated to receive the same configuration data or portion of configuration data. For example, one or more devices in a deployable unit could receive the same credentials, login data or other configuration data.

At block 310, the dynamic configuration system 101 transmits the configuration data to the network device or otherwise causes the network device to load the configuration data. In one embodiment, the network device is configured to load the configuration data when it receives or otherwise obtains the configuration data. The network device then configures itself to operate on the network based on the configuration data provided by the dynamic configuration system 101. At block 312, the routine terminates.

In one embodiment, the dynamic configuration system 101 can transmit the configuration data by identifying the network address of a network device, such as a Trivial File Transfer Protocol (TFTP) server or other file server, on which the configuration data is stored. The network device can then retrieve the configuration data (e.g., configuration file) from the TFTP server. The TFTP server may be part of the dynamic configuration system 101 or external to it.

In one embodiment, network devices may be preloaded with a variety of different configuration data, and the dynamic configuration system 101 designates a portion of that configuration data as being the correct data for a particular network device. For example, the network device may be preloaded with several configuration files and the dynamic configuration system 101 than transmits a command that causes the network device to load a particular file.

Figure 4:
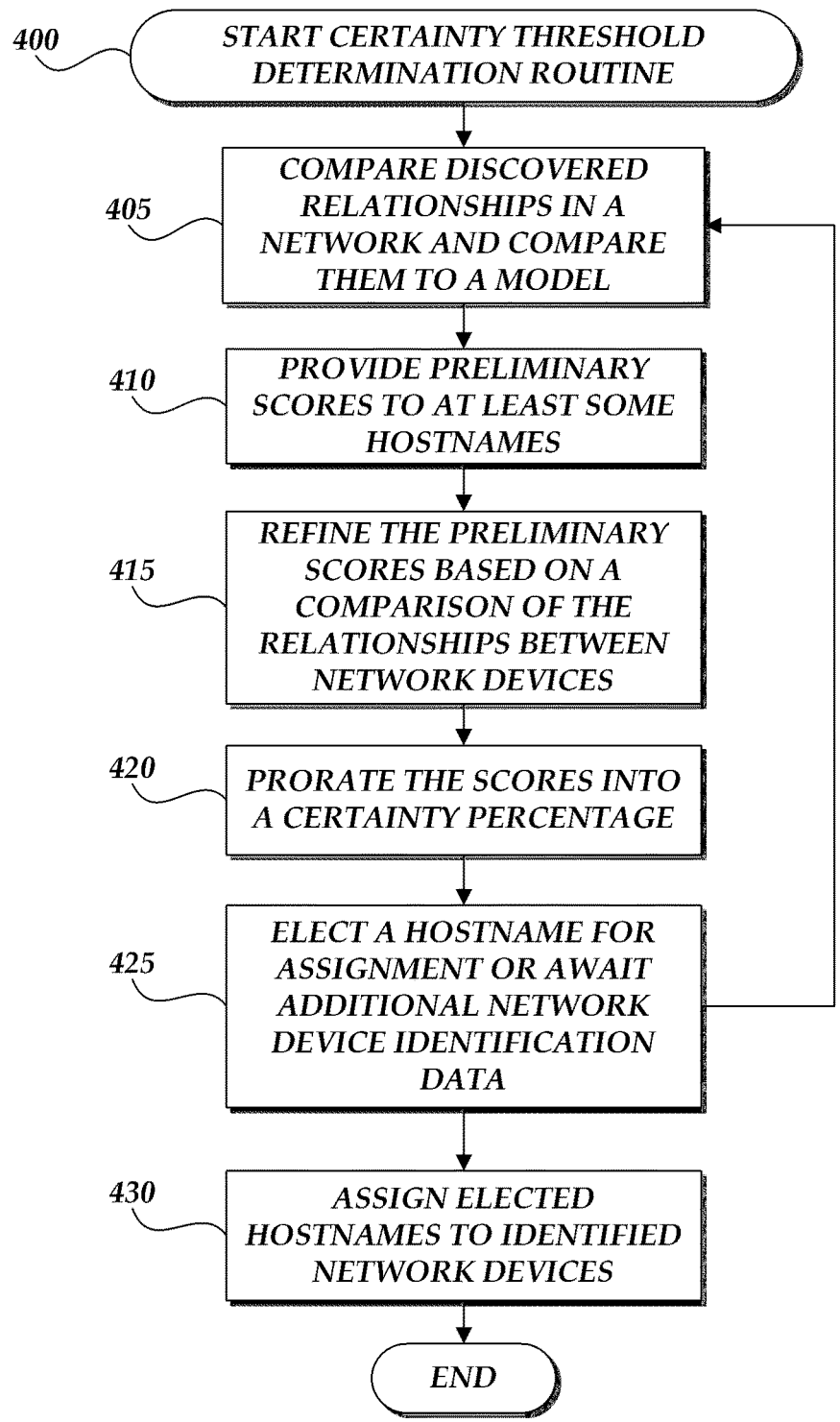
FIG. 4 schematically illustrates a logical flow diagram for an embodiment of a certainty threshold determination routine.

FIG. 4 schematically illustrates a logical flow diagram for an embodiment of a certainty threshold determination routine 400. In some implementations, the routine 400 is utilized by embodiments of the dynamic configuration system 101 described with reference to FIG. 1 or by one of its components, such as the network device management component 102. For ease of explanation, the following describes the services as performed by the dynamic configuration system 101. Further, the following describes the routine with respect to a single network device. However, the routine can be performed with multiple network devices and can be performed in parallel. For example, the routine can be performed for a set of the network devices in a deployable unit (e.g., some or all of the network devices) when the deployable unit is brought online or otherwise reconfigured. The example scenario is intended to illustrate, but not to limit, various aspects of the dynamic configuration system 101.

In one embodiment, scoring takes one or both of two forms based upon the relationship attributes available. The first form can be "lport,rport" with just local port and remote port. The second form can be "lport,rport,rname" with local port, remote port and remote hostname. In one embodiment, the second form is a globally unique relationship that can identify a device assuming there have been no errors in cabling. Additional relationships data can be collected in order to verify the identity. In one embodiment, some certainty thresholds can be set for each class of relationships expressed in a percentage or a fraction where the denominator could be the maximum number of relationships any single device possesses or may possess.

At block 405, dynamic configuration system 101 enumerates over "inventoried" (e.g., discovered) relationships and compares them to a model. When the attributes for a relationship in the model are equal to or match the attributes found in the inventoried relationship, the dynamic configuration system 101 can store a reference in a data structure. For example, the data structure can be a hashmap that can be keyed firstly by the name the hostname and secondly by the memory address of the inventoried relation (e.g., to avoid duplicates).

The data structure can include "hostname" entries and may look like the structure below, although the specific syntax may vary for different programming languages:

```
$VAR1 = {
    'hostnameA' => {
        '0xb2693d4' => {
            'local_port' => '0/4',
            'remote_dev_id' => 'unamed',
```

```
            'remote_port' => '0/6',
        },
        '0xb267730' => {
            'local_port' => '0/12',
            'remote_dev_id' => 'unamed',
            'remote_port' => '0/6',
        },
    },
    'hostnameB' => {
        '0xb2693d4' => $VAR1->{'hostnameA'}{'0xb2693d4)'},
        '0xb267730' => $VAR1->{'hostnameB'}{'0xb267730)'},
            '0xa98ac7c' => {
            'local_port' => '0/7',
            'remote_dev_id' => 'unamed',
            'remote_port' => '0/6',
            },
        }
    };
```

At block 410, the dynamic configuration system 101 can give a preliminary score to at least some hostnames (e.g., hostnameA: 2 and hostnameB: 3). The preliminary score can be an arbitrary number or may be based on current information the dynamic configuration system 101 has about the network devices. Any scoring scale can be used by the dynamic configuration system 101.

At block 415, the dynamic configuration system 101 can refine the preliminary scores based on a comparison of the relationships between network devices. The dynamic configuration system 101 can enumerate over candidate network devices and refine their score. For example, referring to the structure above, the dynamic configuration system 101 could find that hostnameA's relationships are entirely mutual with hostnameB's but that hostnameB has one exclusive relationship when compared to hostnameA. The dynamic configuration system 101 can store a reference to the 0xa98ac7c relationship in a "suspect links" data structure that would represent potentially bad cabling or cables that can be evaluated at a later time. Blocks 405, 410 and 415 may be repeated for the other devices on the network (e.g., some or all other devices on the network).

In one embodiment, the dynamic configuration system 101 compares the relationships in the "suspect links" data structure. For example, for relationships where both hostnames have already been elected, but which are in conflict with the model, the dynamic configuration system 101 can consider the cable invalid and flag the cable for intervention (e.g., fix or replace). In one example, for each unique relationship left in "suspect links", the dynamic configuration system 101 can subtract one from the score of each potential hostname that does not contain this unique relationship. Referring to the above structure example, the dynamic configuration system 101 can subtract hostnameB's number of exclusive relationships "1" from hostnameA's score of 2. In the example, the scores are now hostnameA: 1, hostnameB: 3.

At block 420, the dynamic configuration system 101 can prorate the scores into a certainty percentage for each potential hostname based upon the number of relationships found divided by the total number of relationships that potential hostname has specified in the model. If hostnameA and hostnameB had a maximum of 4 relationships each according to the model, then the percentages could be hostnameA: 25% hostnameB: 75%.

At block 425, the dynamic configuration system 101 can elect a hostname for assignment to a network device. In one embodiment, for any hostname meeting or exceeding the "lport,rport" or "lport,rport,rname" certainty thresholds, the dynamic configuration system 101 1) checks if other potential hostnames better satisfy the threshold, waits for more inventory data and presents the conflict, or 2) ensures that the "lport,rport" scores concur with any of the "lport,rport, rname" scores by using, for example, a method similar to block 420 to ensure some or all relationships are mutual and not exclusive. If the relationships are not mutual, the dynamic configuration system 101 can present or otherwise report the conflict. The routine 400 can then proceed to block 430.

If additional identification data is desired or needed, the dynamic configuration system can wait for more identification to be obtained. Once new identification data is received (e.g., when a new device boots up), the routine 400 can then proceed to block 405 to process the new identification data.

In one embodiment, while processing the relationship data, the dynamic configuration system 101 can mark for remediation any relationship attribute with a valid lport, rport,rname that isn't found in the model. The dynamic configuration system 101 can suggest the relationship rport, rname may have. The dynamic configuration system 101 can additionally look for other bad relationships to see if lport, lname matches the suggestion above.

At block 430, if hostnames were elected, then the dynamic configuration system 101 can assign them to the identified network devices and conclude the identification process for those devices.

While illustrative embodiments have been disclosed and discussed, additional or alternative embodiments may be implemented within the spirit and scope of this disclosure. For example, while some of the disclosure refers to switches or routers, the disclosure can apply to other network devices. Other embodiments are also possible.

In one embodiment, the dynamic configuration system 101 can report the results of the tests to the user so that the user can know the status of network devices on the network. For example, the dynamic configuration system 101 may provide interactive feedback to the user including, for example, indications of the current status of network devices during a self-configuration process (e.g., initialization complete or ongoing, network configuration successful or failed, etc.), errors detected in the network topology (e.g., incorrect cabling) or the like. The dynamic configuration system 101 can provide a real-time or near real-time status of the network devices. In some embodiments, the dynamic configuration system 101 can generate a report detailing or summarizing the status of the network devices and communicate the report to the user via electronic mail or provide access to the report, deployment status, or interactive feedback via Web services.

Notifications (e.g., e-mails, text messages, etc.) may be sent to users of the dynamic configuration system 101 when various events occur. The events can include: the status of a network device self-configuration (e.g., ongoing, complete or failed), the status of a deployable unit, incorrect cabling of network devices being detected, or the like. Notifications can also be set for other events.

Although many embodiments have been indicated as illustrative, the illustrative embodiments do not need to be combined or implemented together. As such, some illustrative embodiments do not need to be utilized or implemented in accordance with the scope of variations to the present disclosure.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in in-app circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A system for dynamically configuring network devices on a communication network, the system comprising:
    a plurality of network devices, wherein at least one network device in the plurality of network devices is missing at least some configuration data for operating on the communication network; and
    a network configuration manager comprising non-transitory computer storage having stored thereon instructions that, when executed by the network configuration manager, cause the network configuration manager to:
        receive a request for configuration data from a first network device in the plurality of network devices and from a second network device in the plurality of network devices;
        obtain identification data for a third network device in the plurality of network devices coupled to the first network device and the second network device;
        determine a first network device identity and a second network device identity in network topology data of the plurality of network devices that are associated with a network device in the plurality of network devices with identification data that matches the identification data for the third network device;
        select first network configuration data for the first network device based at least partly on the first network device identity and second network configuration data for the second network device based at least partly on the second network device identity; and
        transmit the first network configuration data to the first network device and the second network configuration data to the second network device.

2. The system of claim 1, wherein the first network device is configured to utilize the first network configuration data during a self-configuration process.

3. The system of claim 1, wherein the plurality of network devices are arranged into a Clos network.

4. The system of claim 1, wherein at least some network device identities in the network topology data are designated to receive different network configuration data than the first network configuration data or the second network configuration data.

5. The system of claim 1, wherein the first network configuration data comprises at least routing table data.

6. The system of claim 5, wherein the first network configuration data comprises at least one of a network address, host name, or OSPF data.

7. The system of claim 1, wherein the identification data for the third network device comprises at least one of a network address, a device identifier, or a receiving port identifier.

8. The system of claim 1, wherein the network devices include fixed configuration devices.

9. A method for dynamically configuring network devices on a communication network, the method comprising:
    receiving a request for configuration data from a first network device in a plurality of network devices and from a second network device in the plurality of network devices, the request received from a communication network, the first network device and the second network device missing at least some configuration data for operating on the communication network;
    obtaining identification data for a third network device in the plurality of network devices coupled to the first network device and the second network device;

determining a first network device identity and a second network device identity in network topology data of the plurality of network devices that are associated with a network device in the plurality of network devices with identification data that matches the identification data for the third network device;

selecting first network configuration data based at least partly on the first network device identity and second network configuration data for the second network device based at least partly on the second network device identity; and causing the first network configuration data to be loaded by the first network device and the second network configuration data to be loaded by the second network device.

10. The system of claim 9, wherein determining a first network device identity further comprises generating a certainty score for the first network device identity.

11. The method of claim 9, wherein the plurality of network devices are arranged into a Clos network.

12. The method of claim 9, wherein at least some network device identities in the network topology data are designated to receive different network configuration data than the first network configuration data or the second network configuration data.

13. The method of claim 9, wherein the first network configuration data comprises at least routing table data.

14. The method of claim 13, wherein the first network configuration data comprises at least one of a network address, host name, or Open Shortest Path First (OSPF) data.

15. The method of claim 9, wherein the identification data for the third network device comprises at least one of a network address, a device identifier, or a port identifier.

16. Non-transitory computer storage having stored thereon instructions that, when executed by a computer system, cause the computer system to perform operations comprising:

receiving a request for configuration data from a first network device in a plurality of network devices and from a second network device in the plurality of network devices, the request received from a communication network, the first network device and the second network device missing at least some configuration data for operating on the communication network;

obtaining identification data for a third network device in the plurality of network devices coupled to the first network device and the second network device;

determining a first network device identity and a second network device identity in network topology data of the plurality of network devices that are associated with a network device in the plurality of network devices with identification data that matches the identification data for the third network device;

selecting first network configuration data for the first network device based at least partly on the first network device identity and second network configuration data for the second network device based at least partly on the second network device identity; and causing the first network configuration data to be loaded by the first network device and the second network configuration data to be loaded by the second network device.

17. The non-transitory computer storage of claim 16, wherein the first network device is configured to utilize the first network configuration data during a self-configuration process.

18. The non-transitory computer storage of claim 16, wherein the instructions, when executed by the computer system, cause the computer system to further perform operations comprising:

generating a certainty score for the first network device identity found for the first network device; and associating the first network device with the first network device identity in response to the certainty score exceeding a threshold value.

19. The non-transitory computer storage of claim 16, wherein the first network configuration data comprises at least routing table data.

20. The non-transitory computer storage of claim 19, wherein the first network configuration data comprises at least one of a network address, host name, or Open Shortest Path First (OSPF) data.

* * * * *